(12) United States Patent
Nakano

(10) Patent No.: US 6,873,326 B2
(45) Date of Patent: Mar. 29, 2005

(54) TOLERANCE DISPLAY SYSTEM (75) Inventor: Yasuhisa Nakano, Higashiosaka (JP)

(73) Assignee: Nakano Seisakusho Co., Ltd., Osaka (JP)

( * ) Notice: Subject to any disclaimer, the term of this patent is extended or adjusted under 35 U.S.C. 154(b) by 172 days.

(21) Appl. No.: 10/258,537

(22) PCT Filed: Apr. 24, 2001

(86) PCT No.: PCT/JP01/03508

§ 371 (c)(1),
(2), (4) Date: Oct. 25, 2002

(87) PCT Pub. No.: WO01/86465

PCT Pub. Date: Nov. 15, 2001

(65) Prior Publication Data

US 2003/0103051 A1 Jun. 5, 2003

(30) Foreign Application Priority Data

Apr. 28, 2000 (JP) .......................... 2000-129868
Jan. 17, 2001 (JP) .......................... 2001-000144

(51) Int. Cl.$^7$ .............................................. G06T 11/20
(52) U.S. Cl. ...................... 345/440; 345/660; 345/661; 345/643
(58) Field of Search ................................ 345/440, 660, 345/661, 643

(56) References Cited

U.S. PATENT DOCUMENTS

| | | | | |
|---|---|---|---|---|
| 4,785,391 A | * | 11/1988 | Apley et al. ................. | 345/469 |
| 5,345,067 A | * | 9/1994 | Ohta et al. .................. | 219/720 |
| 5,574,843 A | * | 11/1996 | Gerlach, Jr. ................. | 345/418 |
| 5,748,192 A | * | 5/1998 | Lindholm .................... | 345/649 |
| 5,754,873 A | * | 5/1998 | Nolan ......................... | 715/527 |
| 5,771,342 A | * | 6/1998 | Todd ........................... | 345/660 |
| 5,790,094 A | * | 8/1998 | Tanigawa et al. ........... | 345/823 |
| 5,880,709 A | * | 3/1999 | Itai et al. .................... | 345/629 |
| 5,898,419 A | * | 4/1999 | Liu ............................. | 345/660 |
| 5,977,979 A | * | 11/1999 | Clough et al. .............. | 345/422 |
| 6,034,661 A | * | 3/2000 | Servan-Scheiber et al. . | 345/668 |

FOREIGN PATENT DOCUMENTS

| JP | 63-181076 | 7/1988 |
|---|---|---|
| JP | 2-103670 | 4/1990 |
| JP | 3019268 | 10/1995 |

* cited by examiner

Primary Examiner—Matthew C. Bella
Assistant Examiner—Mike Rahmjoo
(74) Attorney, Agent, or Firm—Keating & Bennett, LLP (57) ABSTRACT A tolerance display system allows workers to easily obtain accurate size information at actual worksites. The tolerance display system includes a tolerance display device which has a storage device storing standards data/files related to general tolerance, an information input device for inputting information, an operation unit for reading out standards data related to a general tolerance from the storage device based on data input by the information input device and calculating limits of size, and an output device for displaying the standards data, the limits of size and other information. The information input device includes an industry type menu input portion for selecting and inputting a product name of a desired industry type, a specified condition input portion for inputting specified conditions such as a special item, a tolerance class, a basic dimension, and a numerical value/arithmetic operator input portion for inputting a numerical value/arithmetic operator.

6 Claims, 7 Drawing Sheets

TOLERANCE DISPLAY SYSTEM

BACKGROUND OF THE INVENTION

1. Field of the Invention

The present invention relates to a tolerance display system, and more particularly, to a tolerance display system used by workers engaged in working on various products such as iron castings, open die forgings, aluminum alloy castings, steel castings, metallic sintered products, die castings, parts formed by shear working of sheet metal, and parts formed by press working of sheet metal. The display system displays general tolerance information without direct individual tolerance indication in manufacturing drawings, and limits of size calculated based on such drawings.

2. Description of the Related Art

In manufacturing drawings used in worksites in various manufacturing and machining industries, dimensional tolerances, for example, based on national standards are indicated. The general dimensional tolerance (permissible deviation in dimensions without tolerance indication) meant for simplifying indications in drawings have no individual tolerance indication and no tolerance indication for individual sizes on drawings, but are given collectively in the form of a list of standards. The general tolerance is mainly applied to the dimensions of parts that do not require particularly high precision in view of their functions.

In working at actual worksites, the general tolerance is still very important and indispensable information in manufacturing high quality products, but such information is not included in the dimensions given in drawings.

Meanwhile, conventionally, in worksites in various manufacturing and machining industries, general tolerances are known to workers only based on their sense and experience of many years or through a list of standards. In some cases, general tolerance values available from the standards list are used to calculate limits of size on paper or using a desktop calculator (hereinafter simply as a "calculator"), and the results are added or used for correction of the sizes given on the manufacture drawings.

According to the conventional method, however, the operation heavily depends on the experience and sense of workers, in other words on their memory. As a result, accurate limits of size are sometimes not available when the workers are in error. It is difficult and time consuming to review the standards list, carry out calculation on paper or using a calculator based on the obtained values of general tolerances, and then finally add or correct dimensions on the actual manufacture drawings. It is highly possible that workers may read incorrect values of general tolerances by mistake when they review the list. The standards lists are often kept at offices that are remote from worksites, or in reality they cannot easily be carried, in other words, they are not easy to use for the workers.

Therefore, in the conventional methods, accurate dimensional information necessary for producing high quality products, in other words, limits of size, are not readily and easily available to the workers.

SUMMARY OF THE INVENTION

In order to overcome the problems described above, preferred embodiments of the present invention provide a tolerance display system that allows accurate dimensional information to be easily available to workers at actual worksites.

A tolerance display system according to a preferred embodiment of the present invention includes a storage device storing standards data and files related to a general tolerance, an information input device for inputting prescribed information, an operation unit for reading out standards data related to the general tolerance from the storage device based on data input by the information input device, and calculating limits of size, an output device for displaying the input data, the standards data, and the limits of size, and a controller for managing/controlling the storage device, the input device, the operation unit and the output device. The information input device includes an industry type menu input portion for selecting and inputting an industry type represented by the type of a desired product, a specified condition input portion for inputting a specified condition such as a special item, a tolerance class, and a basic dimension, and a numerical value/arithmetic operator input portion for inputting a numerical value/arithmetic operator.

In the tolerance display system, the industry type menu input portion may include an industry type menu input keyboard for selecting an industry type, for example, represented by the name of a desired product, the numerical value/arithmetic operator input portion may include a numerical value/arithmetic operator input keyboard for inputting a numerical value/arithmetic operator, and the specified condition input portion may include a special item input keyboard for inputting a special item such as the type of shape, the type of product, the type of a manufacturing method, the type of material, the type of size, and the type of a geometrical characteristic, a basic dimension division input keyboard for selecting the division of a basic dimension, a tolerance class input keyboard for selecting a tolerance class and a general tolerance input keyboard for inputting a calculated general dimensional tolerance.

In the tolerance display system, the standards data may automatically be retrieved based on each input data, and a calculation processing for limits of size related to the special item of the input industry type menu may be carried out.

In the tolerance display system, it is more effective that the input data, the retrieved standards data, the limits of size obtained by the calculation processing and the unit thereof are displayed by the output device.

In the tolerance display system according to preferred embodiments of the present invention, using the industry type menu input portion, an industry type, for example, represented by the type of a desired product is selected, and any of standards data/files stored in the storage device in advance is accessed in order to specify the range of application for specifying general dimensional tolerances for the desired product. Then, using the information input device, prescribed specified conditions are input, and desired standards data related to the specified conditions are automatically retrieved. Then, using the operation unit, retrieval/calculation result information such as general tolerances and limits of size based on the general tolerances is obtained. The retrieval/calculation result information thus obtained is displayed by the output device.

The foregoing and other elements, characteristics, features, and advantages of the present invention will become more apparent from the following detailed description of preferred embodiments of the present invention when taken in conjunction with the accompanying drawings.

DETAILED DESCRIPTION OF PREFERRED EMBODIMENTS

Figure 1:
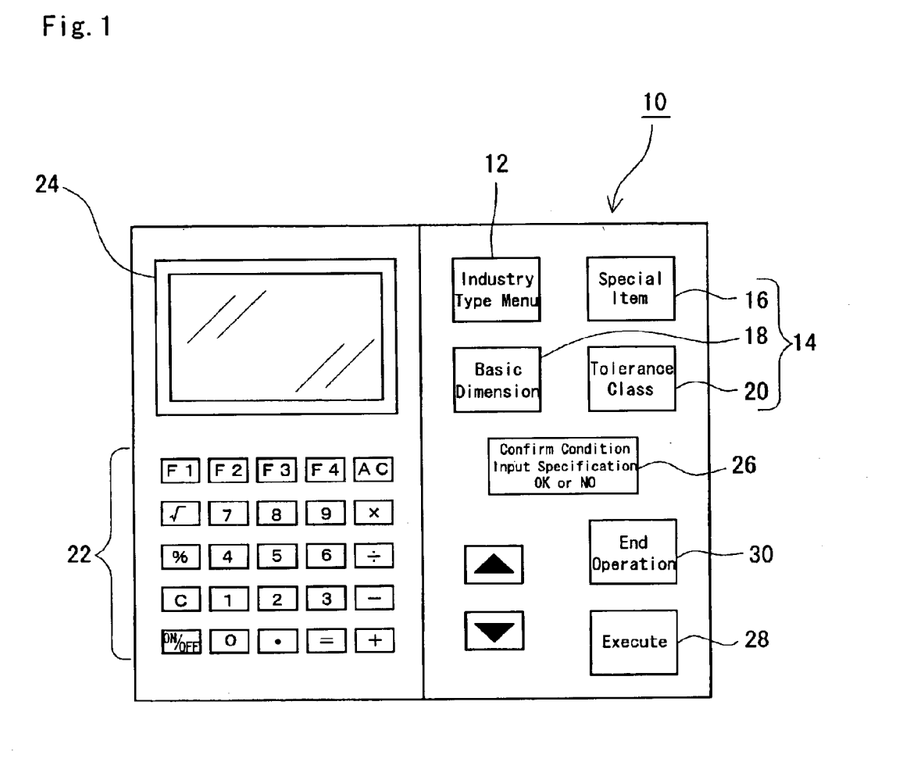
FIG. 1 is a diagram showing a preferred embodiment of the present invention.
Figure 2:
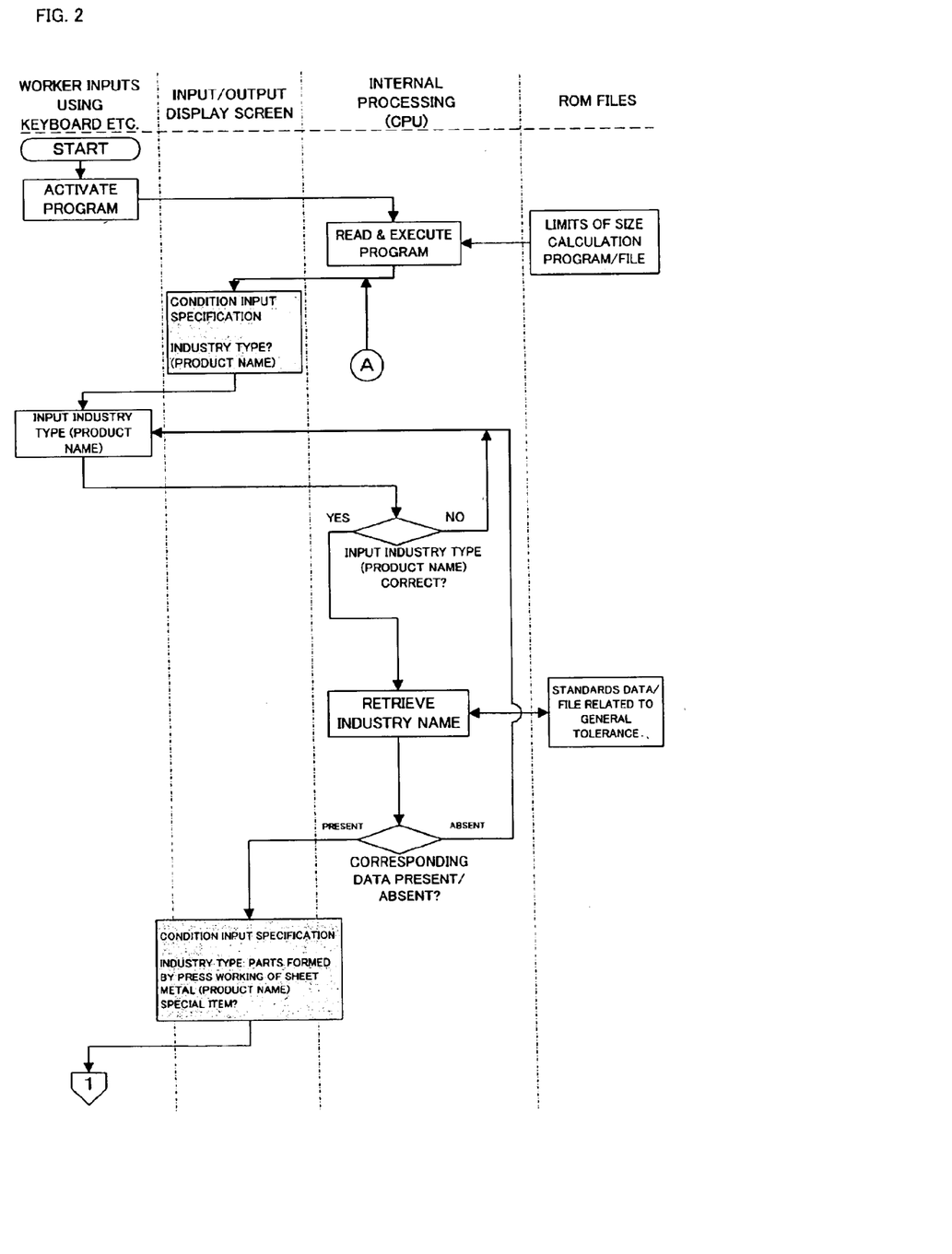
FIG. 2 is a system flowchart for use in illustration of the preferred embodiment shown in FIG. 1.
Figure 3:
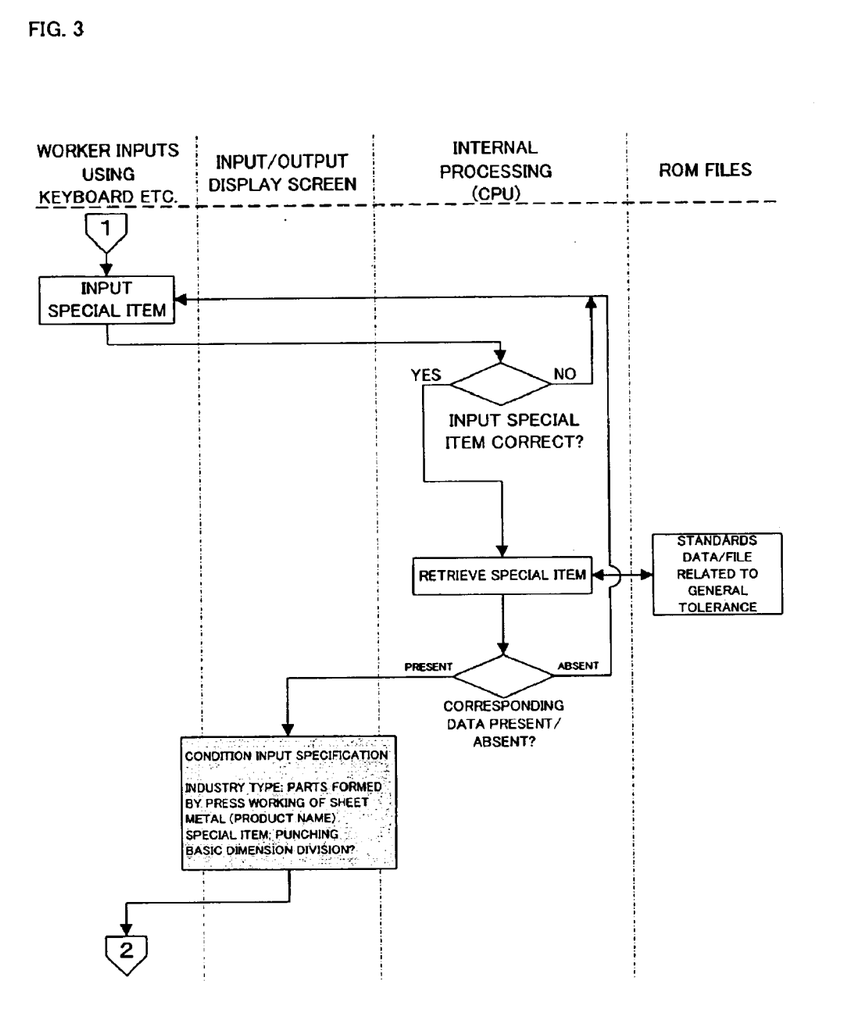
FIG. 3 is a system flowchart for use in illustration of the preferred embodiment shown in FIG. 1, continued from FIG. 2.
Figure 4:
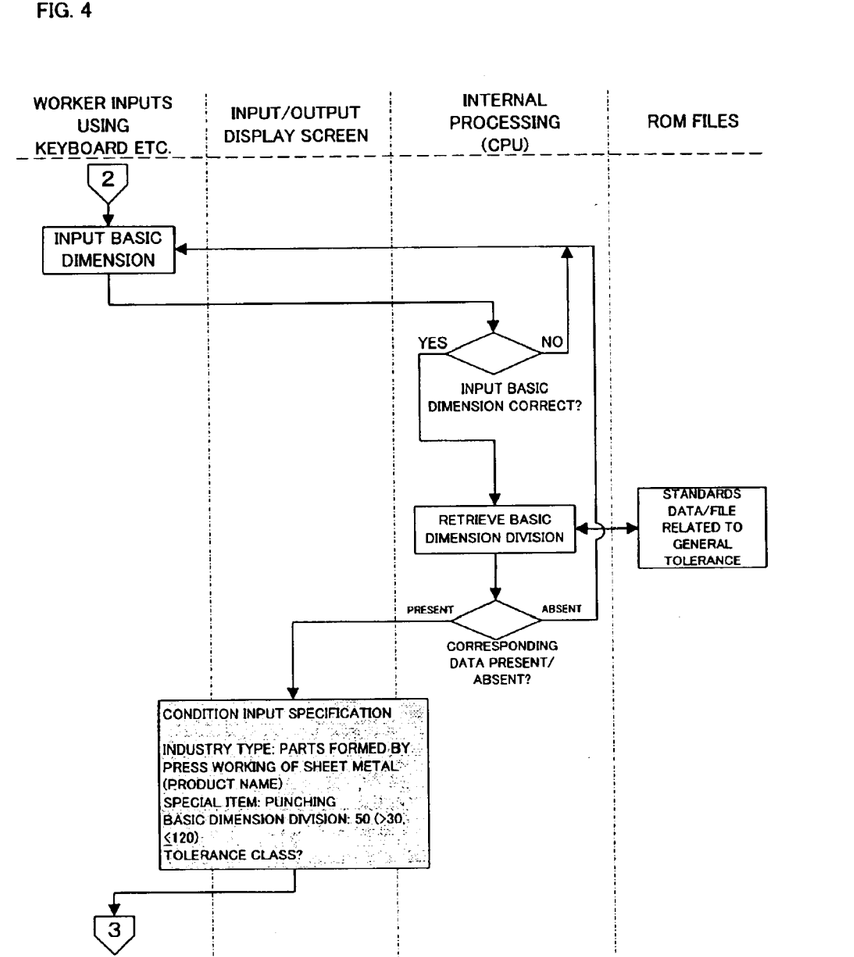
FIG. 4 is a system flowchart for use in illustration of the preferred embodiment shown in FIG. 1, continued from FIG. 3.
Figure 5:
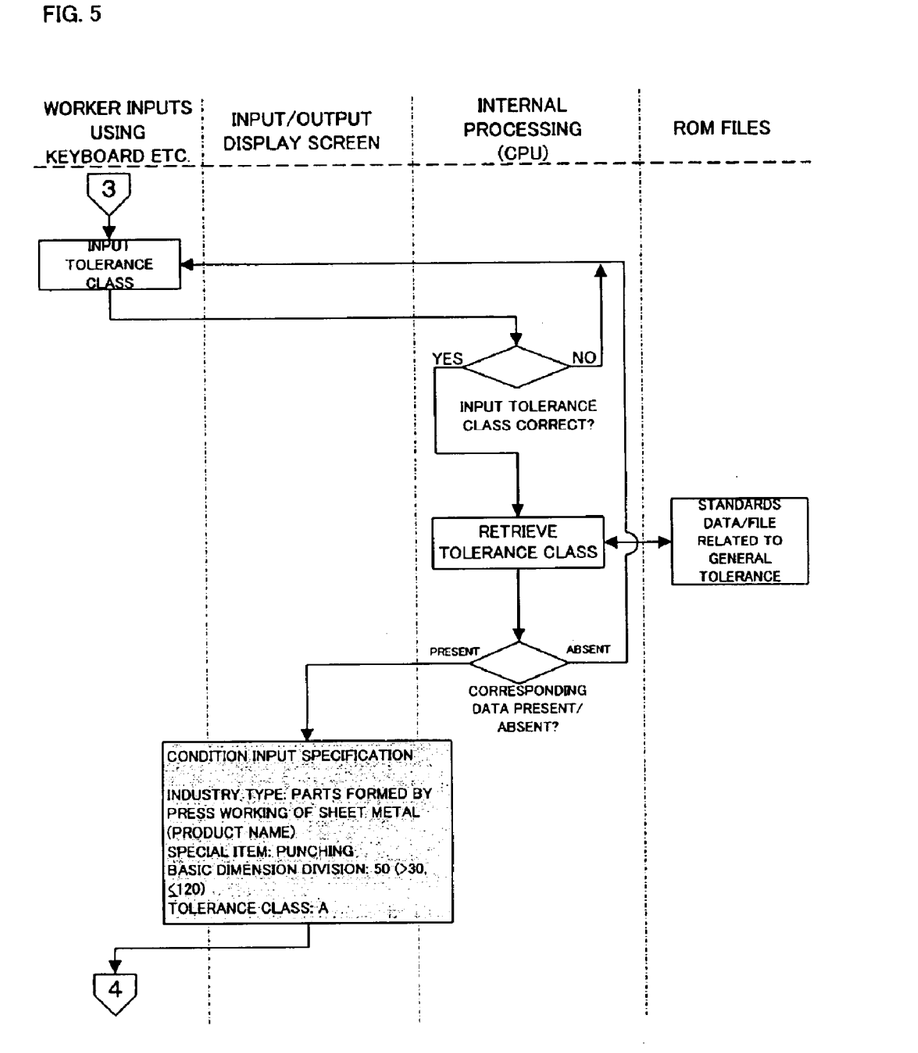
FIG. 5 is a system flowchart for use in illustration of the preferred embodiment shown in FIG. 1, continued from FIG. 4.
Figure 6:
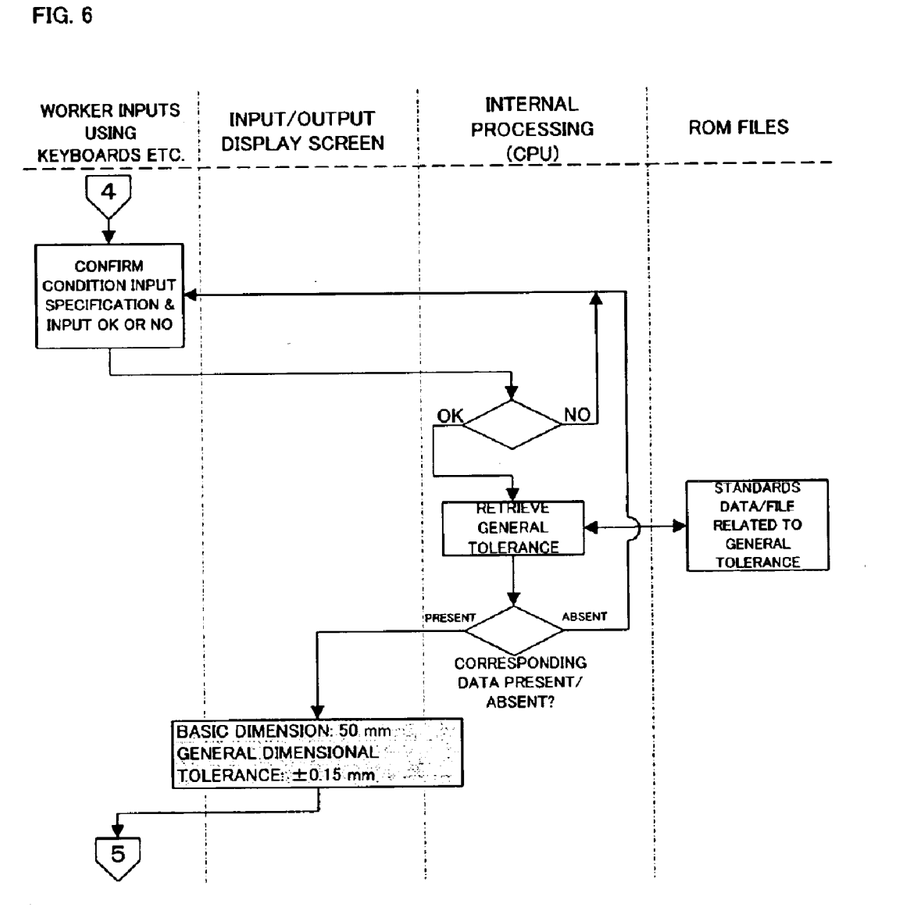
FIG. 6 is a system flowchart for use in illustration of the preferred embodiment shown in FIG. 1, continued from FIG. 5.
Figure 7:
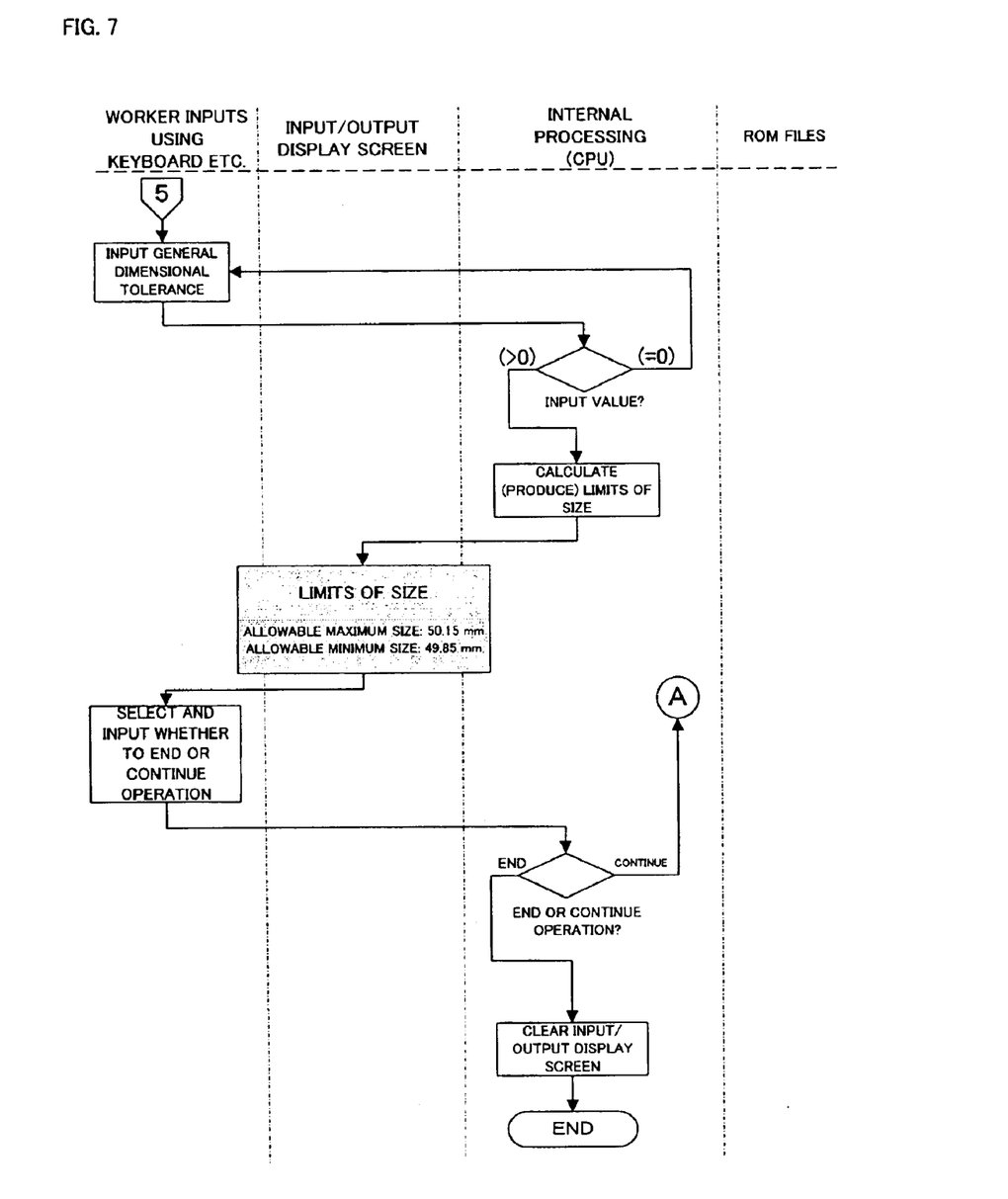
FIG. 7 is a system flowchart for use in illustration of the preferred embodiment shown in FIG. 1, continued from FIG. 6.

FIG. 1 is a diagram showing a preferred embodiment of the present invention.

A tolerance display system according to the present preferred embodiment includes a tolerance display device 10. The tolerance display device 10 has a digital calculator function like a desktop calculator capable of carrying out the four arithmetic operations and is in an easy to carry, compact, twofold (double spread) form, for example. Therefore, the tolerance display device 10 can easily be carried by a worker in an actual worksite and provide high operability.

The tolerance display device 10 includes a storage device storing standards data/files related to general tolerances according to national standards such as Japanese Industrial Standards (JIS). The storage device preferably includes a ROM file, for example. The ROM file pre-stores various standards data including special items in connection with the general tolerance. The data includes lists of divisions of basic dimensions, tolerance classes, general dimensional tolerances and the like specified by JIS, product names, working methods, the applicability of materials for each individual industry type to which the standards data is applied, general items, terminology, instructions on drawings, notes, and the like.

Note that RAM files may be used instead of ROM files. The tolerance display device 10 according to the preferred embodiment has a minimum calculation function to carry out four arithmetic operations for twelve digit numbers, for example. The device 10 includes a storage device having a minimum storage capacity about in the range from 512 KB to 1024 KB, for example.

The tolerance display device 10 includes an information input device for inputting various types of standards data related to the general tolerances and prescribed specified information in association with the data, so that the data can be effectively utilized.

For example, the information input device includes an industry type menu input keyboard 12 as a first input portion (industry type menu input portion) for selecting and inputting an industry type menu represented by a product name for a desired industry type. The industry type menu input keyboard 12 is provided on the upper right side of the tolerance display device 10.

There is a specified condition input keyboard group 14 as a second input portion (specified condition input portion) provided near the industry type menu input keyboard 12 for inputting specified conditions such as a product name, a special item, a basic dimension, and a tolerance class. The specified condition input keyboard group 14 includes a special item input keyboard 16 used to input a special item such as a working method and a material, a basic dimension input keyboard 18 used to input the division of a basic dimension, and a tolerance class input keyboard 20 used to input a tolerance class. There is a numerical value/arithmetic operator input keyboard 22 as a third input portion (numerical value/arithmetic operator input portion) used to input individual numerical values, or carry out an arithmetic operation on the left side of the tolerance display device 10.

Note that these various input keyboards are formed and arranged so that characters, symbols, drawings and the like are visually simple and calculation can be carried out by simple operation.

The tolerance display device 10 has an operation unit that reads out standards data related to a general tolerance from the storage device based on data input by the information input device, and calculates limits of size for a working method for a desired product using a stored limits of size calculation program/file or the like. An upper portion of the numerical value/arithmetic operator input keyboard 22 is an input/output display screen 24. The screen defines an output device for displaying various types of input/output data such as input data, standards data related to general tolerance and limits of size. Note that the input/output display screen 24 according to the present preferred embodiment is preferably a liquid crystal display screen having a display function for about 128×64 dots, for example.

The tolerance display device 10 has a controller for managing/controlling so that the storage device, the information input device, the operation unit and the output device operate in a regulated manner and appropriately in cooperation with each other. According to the present preferred embodiment, the operation unit and the control device are implemented by a single central processing unit (CPU).

In the tolerance display device 10, an industry type menu desired to be activated is selected using the industry type menu input keyboard 12 and then standards data/files related to pre-stored general tolerance are accessed. Then, using the specified condition input keyboard group 14, prescribed specified conditions are input. Then, specified products, working methods, material names, divisions of basic dimensions, tolerance classes and the like are automatically retrieved from the database related to the input specified conditions and displayed on the input/output display screen 24 as retrieval result information. The retrieval result on the input/output display screen 24 is checked as required, and this operation is repeated a number of times, so that desired limits of size (allowable maximum size and allowable minimum size) are finally available to the user (worker).

With reference to the flowcharts in FIGS. 2, 3, 4, and 5, a system for calculating general dimensional tolerance, for example, for parts formed by press working of sheet metal and limits of size based thereon will be described as an example of a tolerance display system using the tolerance display device 10 according to the present preferred embodiment.

The power supply key (AC) of the numerical value/arithmetic operator input keyboard 22 is turned on. Keys at the industry type menu input keyboard 12 are pressed to command program activation and activates the limits of size calculation program/file. According to the procedure displayed on the input/output display screen 24, various types of data are input such as an industry type (product name)= parts formed by press working of sheet metal, a special item (kind of press working) punching, a basic dimension=50 mm, and tolerance class=A. Then, the worker is requested to check whether the content of the input condition specifications is correct on the input/output display screen 24.

When the content of the input condition specifications is confirmed to be correct, an input condition specification confirmation key 26 is pressed once to enter OK. In this case, the "OK" is indicated on the input/output display screen 24 in response to the single pressing of the input condition specification confirmation key 26. When the key is pressed twice, "NO" is indicated. In that case, the execution key 28 may be pressed after the displayed content is confirmed. Then, a corresponding general dimensional tolerance of ±0.15 (unit: mm) is retrieved from standards data/files related to the general dimensional tolerance, and displayed together with the basic dimension on the input/output display screen 24. According to the procedure displayed on the input/output display screen 24, the thus retrieved general dimensional tolerance, ±0.15 is input using the numerical value/arithmetic operator input keyboard 22 and the execution key 28 is pressed. Then, calculated data for the range of actual working sizes (allowable maximum and minimum size (unit: mm)) is displayed on the input/output display screen 24.

After acknowledging the desired limits of size, the worker selects whether or not to continue the operation. When the operation is to end, the operation end key 30 is pressed to end the operation. The operator then starts manufacturing the product based on the calculated actual working sizes (allowable maximum and minimum size (unit: mm)). If the operation is to be continued, the control returns to the initial operation and keys on the industry type menu input keyboard 12 are once again pressed to activate the activation program, and the above flow may be repeated according to the procedure displayed on the input/output display screen 24.

The conventional systems depend on the worker's expertise or sense or the worker's efforts to find general dimensional tolerance by referring to JIS standards lists, and add or correct sizes displayed on actual manufacture drawings. In this way, necessary working sizes, in other words, limits of size are obtained. Meanwhile, by the tolerance display system according to the present preferred embodiment of the present invention, the following effects are provided.

More specifically, the effects of the tolerance display system according to the preferred embodiment are:

(1) Data such as product names, working methods, material kinds, tolerance classes, symbols, descriptions, divisions of basic dimensions, general dimensional tolerances, remarks, and notes are arranged and stored in databases, and therefore necessary working size information is available without much effort simply by operating the information input device. As a result, the time required for checking can significantly be shorter than the conventional methods.

(2) Since the JIS standards data relating to general tolerance is provided in the form of databases, errors such as reading wrong values which are likely to happen in the course of manually checking the actual JIS standards lists can be prevented.

(3) Since the program used to calculate limits of size (allowable maximum and minimum size) based on general tolerance is stored, calculation can be carried out by inputting necessary information using the information input means. As a result, calculation mistakes can significantly be less than the case of calculating individual values.

Note that in the described preferred embodiment, the tolerance display system using Japanese Industrial Standards (JIS) is used as an example of standards related to tolerance. Meanwhile, the present invention is not limited to this, and standards data related to tolerance used in a country of interest can be used among various other countries to which the tolerance display system is applied.

More specifically, in the tolerance display system according to preferred embodiments of the present invention, standards data/files that can be stored in the storage device include those related to various tolerances, for example by American National Standards Institute (ANSI), Chinese Industrial Standards (CIS), Korean National Standards (KS), German Institute for Standardization (DIN), British Standards Institution (BSI), Italian National Agency of Unification (Unificazione Italiano, UNI), European Standards (EN), and International Organization for Standardization (ISO).

As described above, according to preferred embodiments of the present invention, the tolerance display system that allows workers to easily obtain accurate size information in actual worksites is provided. Therefore, the tolerance display system according to the preferred embodiments eliminates errors caused by careless mistakes by the workers, and therefore the workers can feel at ease during working. Therefore, losses by defects can significantly be reduced, and considerably high quality products can be manufactured.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A tolerance display system, comprising:

a storage device storing standards data/files related to a general tolerance;

an information input device arranged to input prescribed information;

an operation unit arranged to read out standards data related to said general tolerance from said storage device based on data input by said information input device, and calculating limits of size;

an output device arranged to display said input data, said standards data, and said limits of size; and a controller arranged to manage and control said storage device, said input device, said operation unit and said output device;

said information input device including:

an industry type menu input portion for selecting and inputting an industry type represented by the type of a desired product;

a specified condition input portion for inputting a specified condition including at least one of a special item, a tolerance class, or a basic dimension; and a numerical value/arithmetic operator input portion for inputting a numerical value/an arithmetic operator; wherein said industry type menu input portion includes an industry type menu input keyboard for selecting an industry type represented by a name of a desired product, said numerical value/arithmetic operator input portion includes a numerical value/arithmetic operator input keyboard for inputting a numerical value/an arithmetic operator, and said specified condition input portion includes a special item input keyboard for inputting said special item of interest including at least one of the type of a shape, the type of a product, the type of a working method, the type of a material, the type of a size, the type of a geometrical characteristic, a basic dimension division input keyboard for selecting the division of said basic dimension, a tolerance class input keyboard for selecting said tolerance class or a general tolerance input keyboard for inputting a calculated general dimensional tolerance.

2. The tolerance display system according to claim 1, wherein said standards data is automatically retrieved based on said input data, and a calculation processing for limits of size related to the special item of said input industry type menu is carried out.

3. The tolerance display system according to claim 1, wherein said input data, said retrieved standards data, said limits of size obtained by the calculation processing and the unit thereof are displayed by said output device.

4. A tolerance display system, comprising:

storage means storing standards data and files related to a general tolerance;

information input means for inputting prescribed information;

operation means for reading out standards data related to said general tolerance from said storage means based on data input by said information input means, and calculating limits of size;

output means for displaying said input data, said standards data, and said limits of size; and control means for managing and controlling said storage means, said input means, said operation means and said output means;

said information input means including:

an industry type menu input portion for selecting and inputting an industry type represented by the type of a desired product;

a specified condition input portion for inputting a specified condition such as a special item, a tolerance class, or a basic dimension; and a numerical value/arithmetic operator input portion for inputting a numerical value/an arithmetic operator; wherein said industry type menu input portion includes an industry type menu input keyboard for selecting an industry type represented by a name of a desired product, said numerical value/arithmetic operator input portion includes a numerical value/arithmetic operator input keyboard for inputting a numerical value and an arithmetic operator, and said specified condition input portion includes a special item input keyboard for inputting said special item of interest including at least one of the type of a shape, the type of a product, the type of a working method, the type of a material, the type of a size, the type of a geometrical characteristic, a basic dimension division input keyboard for selecting the division of said basic dimension, a tolerance class input keyboard for selecting said tolerance class armor a general tolerance input keyboard for inputting a calculated general dimensional tolerance.

5. The tolerance display system according to claim 4, wherein said standards data is automatically retrieved based on said input data, and a calculation processing for limits of size related to the special item of said input industry type menu is carried out.

6. The tolerance display system according to claim 4, wherein said input data, said retrieved standards data, said limits of size obtained by the calculation processing and the unit thereof are displayed by said output means.

* * * * *